(12) United States Patent
Enomoto et al.

(10) Patent No.: US 12,016,085 B2
(45) Date of Patent: Jun. 18, 2024

(54) POWER CONTROL DEVICE AND POWER CONTROL METHOD

(71) Applicant: Nissan Motor Co., Ltd., Kanagawa (JP)

(72) Inventors: Hiroaki Enomoto, Kanagawa (JP); Yaojun Hu, Kanagawa (JP); Chihiro Hirose, Kanagawa (JP); Tetsuya Kitakatsu, Kanagawa (JP); Shishou Gen, Kanagawa (JP); Toru Yasunaga, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 17/633,070

(22) PCT Filed: Mar. 30, 2021

(86) PCT No.: PCT/JP2021/013699
§ 371 (c)(1),
(2) Date: Oct. 6, 2022

(87) PCT Pub. No.: WO2022/208693
PCT Pub. Date: Oct. 6, 2022

(65) Prior Publication Data
US 2023/0380014 A1 Nov. 23, 2023

(51) Int. Cl.
*H05B 1/02* (2006.01)
*B60H 1/00* (2006.01)
(Continued)

(52) U.S. Cl.
CPC ....... *H05B 1/0236* (2013.01); *B60H 1/00764* (2013.01); *B60H 1/2218* (2013.01); *B60S 1/026* (2013.01); *H05B 3/84* (2013.01)

(58) Field of Classification Search
CPC .............. B60H 1/00764; B60H 1/2218; B60H 2001/2265; B60J 1/20; B60S 1/026; H05B 1/0236; H05B 3/84
See application file for complete search history.

(56) References Cited

U.S. PATENT DOCUMENTS 6,011,244 A * 1/2000 Castle ...................... H05B 3/84
219/202
7,652,226 B2 1/2010 Muromachi et al.
(Continued)

FOREIGN PATENT DOCUMENTS

CN 104395118 A 3/2015
JP H1-14551 U 10/1989
(Continued)

*Primary Examiner* — Dana Ross
*Assistant Examiner* — Joe E Mills, Jr.
(74) *Attorney, Agent, or Firm* — Osha Bergman Watanabe & Burton LLP

(57) ABSTRACT

A power control device of the present invention controls the electric power of a vehicle which includes hot-wire heaters provided respectively in a plurality of areas which are obtained by dividing a front window. In particular, the power control device of the present invention switches between alternating control and entire surface control based on an external air temperature of the vehicle and a speed of the vehicle, the alternating control being for sequentially energizing each hot-wire heater provided in each of the plurality of areas, and the entire surface control being for simultaneously energizing all the hot-wire heaters provided in the plurality of areas.

6 Claims, 4 Drawing Sheets

(51) Int. Cl.
*B60H 1/22*      (2006.01)
*B60S 1/02*      (2006.01)
*H05B 3/84*      (2006.01)

(56) References Cited

U.S. PATENT DOCUMENTS

| | | |
|---|---|---|
| 10,131,197 B2 | 11/2018 | Higuchi et al. |
| 2007/0278200 A1 | 12/2007 | Muromachi et al. |
| 2009/0206068 A1* | 8/2009 | Ishizeki ............ B32B 17/10385 |
| | | 219/203 |
| 2012/0245794 A1 | 9/2012 | Aragai et al. |
| 2015/0183291 A1 | 7/2015 | Higuchi et al. |
| 2020/0230923 A1 | 7/2020 | Nishioka |

FOREIGN PATENT DOCUMENTS

| | | |
|---|---|---|
| JP | 07-042885 Y | 10/1995 |
| JP | H10-270147 A | 10/1998 |
| JP | 2005145211 A | 6/2005 |
| JP | 2007145293 A | 6/2007 |
| JP | 2010036592 A | 2/2010 |
| JP | 2012200100 A | 10/2012 |
| JP | 2019031239 A | 2/2019 |
| JP | 2020152235 A | 9/2020 |
| WO | 2019078258 A1 | 4/2019 |

* cited by examiner

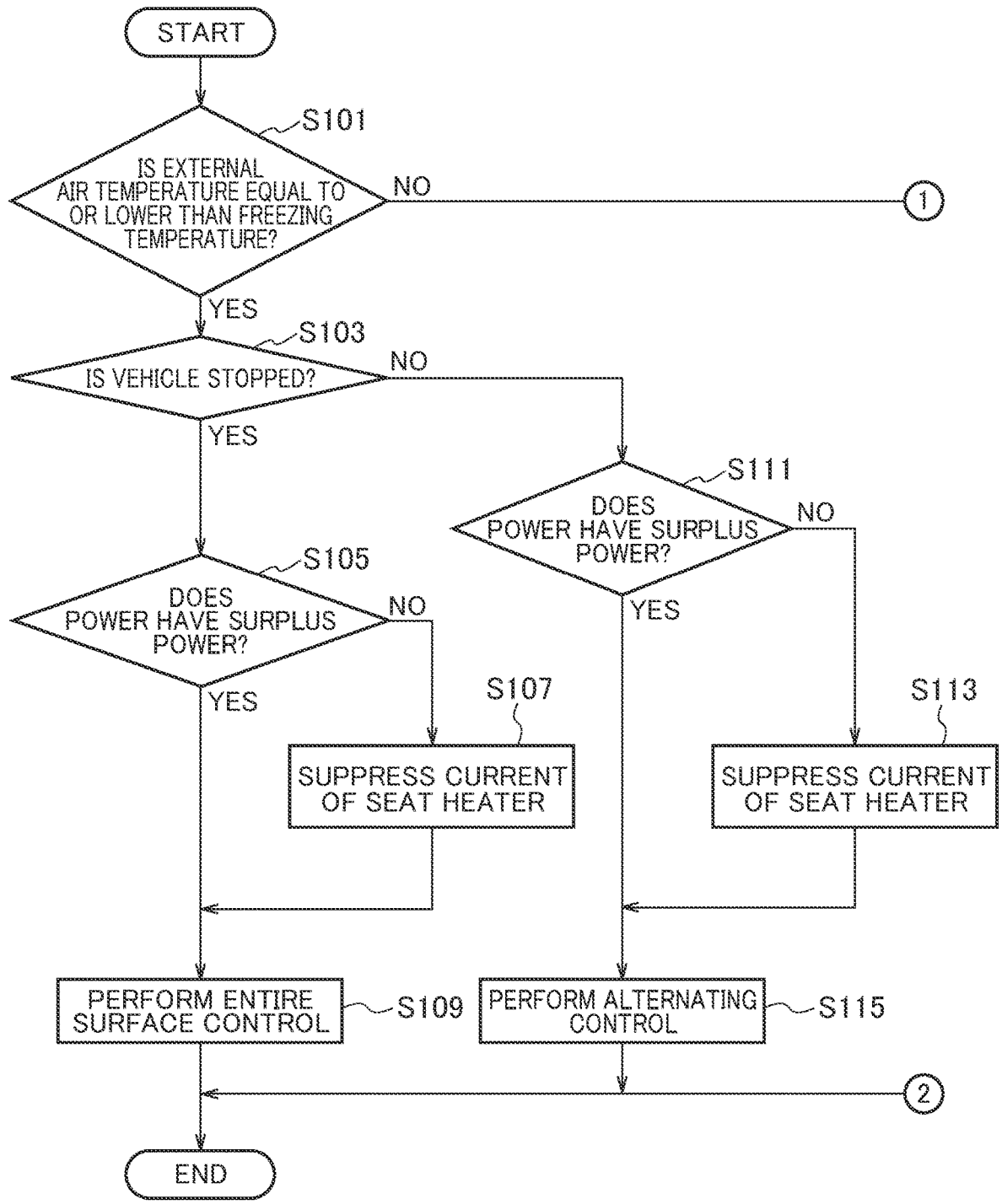

POWER CONTROL DEVICE AND POWER CONTROL METHOD

TECHNICAL FIELD

The present invention relates to a power control device and a power control method for controlling electric power of a vehicle which includes hot-wire heaters provided respectively in a plurality of areas which are obtained by dividing a front window.

BACKGROUND ART

Patent Literature 1 discloses a heater device having heaters provided at a front window of a vehicle. In the conventional heater device disclosed in Patent Literature 1, heaters are individually disposed in an upper area, side areas, a center area, and a lower area of the front window. The area in which a heater is to be energized was determined according to the external air temperature and the speed of the vehicle.

CITATION LIST

Patent Literature

Patent Literature 1 Japanese Unexamined Patent Application Publication No. 2010-36592

SUMMARY OF THE INVENTION

Technical Problem

However, in the above-described conventional heater device, when the heaters provided at the front window are energized, there has been a problem that no consideration has been given to saving power consumption even though the power consumption becomes large. In particular, in the case of an electric vehicle, the amount of power that can be supplied is limited, and therefore saving power consumption has been an important problem to be solved.

Therefore, the present invention has been proposed in view of the above-described problem, and an object of the present invention is to provide a power control device and a power control method capable of reducing the power consumption of a vehicle when hot-wire heaters provided at a front window are energized.

Technical Solution

In order to solve the above-described problem, a power control device and a power control method according to an aspect of the present invention switch between alternating control and entire surface control based on the external air temperature of a vehicle and the speed of the vehicle, the alternating control being for sequentially energizing each hot-wire heater provided in each of a plurality of areas of a front window, and the entire surface control being for simultaneously energizing all the hot-wire heaters provided in the plurality of areas.

Advantageous Effect of the Invention

According to the present invention, the power consumption of a vehicle can be reduced when hot-wire heaters provided at a front window are energized.

BRIEF DESCRIPTION OF THE DRAWINGS

FIG. 3A is a flowchart showing a process procedure of a power control process performed by a power control device according to an embodiment of the present invention.

DESCRIPTION OF EMBODIMENTS

Figure 1:
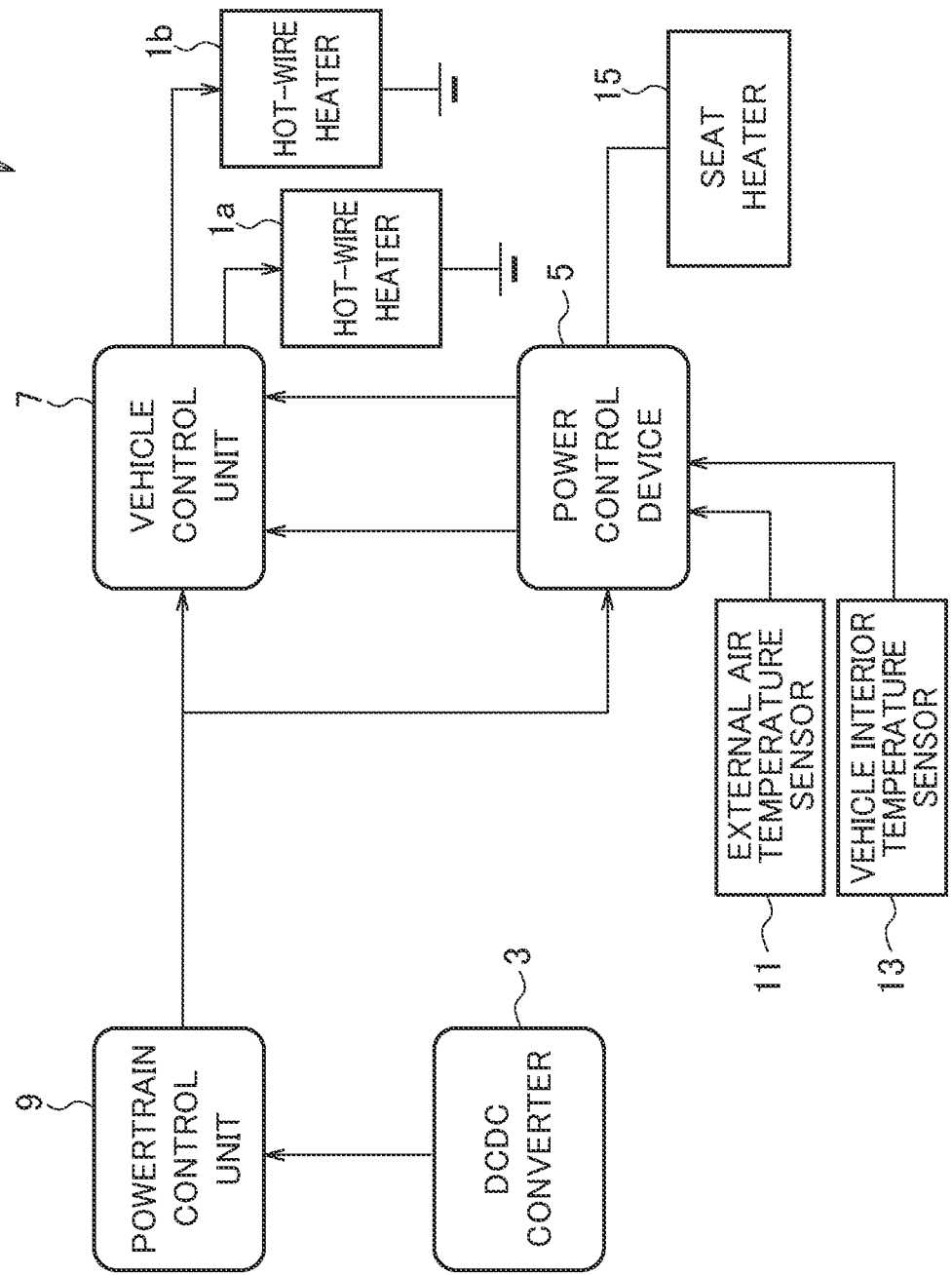
FIG. 1 is a block diagram showing the configuration of a vehicle in which a power control device according to an embodiment of the present invention is installed.

Hereinafter, an embodiment to which the present invention is applied will be described with reference to the drawings. In descriptions of the drawings, the same parts are denoted by the same reference numerals, and a detailed description thereof will be omitted.

[Configuration of Vehicle in which Power Control Device is Installed]

FIG. 1 is a block diagram showing a configuration of a vehicle in which a power control device according to the present embodiment is installed. As shown in FIG. 1, a vehicle 100 includes hot-wire heaters 1a and 1b, a DCDC converter 3, a power control device 5, a vehicle control unit 7, a powertrain control unit 9, an external air temperature sensor 11, a vehicle interior temperature sensor 13, and a seat heater 15. In the present embodiment, a case where the vehicle 100 is an electric vehicle will be described, but a vehicle having a normal internal combustion engine may be used.

The hot-wire heaters 1a and 1b are provided respectively in a plurality of areas which are obtained by dividing a front window. For example, in FIG. 2, a front window is divided into two electrothermal areas that are a left electrothermal area 20a and a right electrothermal area 20b. The hot-wire heater 1a is formed by disposing energizing electrodes 21a and 23a on the top side and the bottom side of the left electrothermal area 20a respectively. Similarly, the hot-wire heater 1b is formed by disposing energizing electrodes 21b and 23b on the top side and the bottom side of the right electrothermal area 20b respectively. However, it is not necessary to limit the number of hot-wire heaters to two, and three or more hot-wire heaters may be provided by dividing a front window into three or more areas.

The DCDC converter 3 converts a high voltage for driving a motor into a voltage to be supplied to electric components of the vehicle 100, and supplies power to each electric component. In the present embodiment, power is supplied from the DCDC converter 3 to the hot-wire heaters 1a and 1b and the seat heater 15.

The power control device 5 controls power supplied to each electric component of the vehicle 100, and in the present embodiment, controls power supplied to the hot-wire heaters 1a and 1b and the seat heater 15. Specifically, the power control device 5 switches between alternating control and entire surface control based on the external air temperature of the vehicle and the speed of the vehicle, the alternating control being for sequentially energizing each hot-wire heater provided in each of the plurality of areas of the front window, and the entire surface control being for simultaneously energizing all the hot-wire heaters provided in the plurality of areas of the front window.

In particular, when the external air temperature of the vehicle 100 is equal to or lower than the temperature at which the front window freezes (first temperature) and the speed of the vehicle 100 is equal to or slower than the speed at which the vehicle is considered to be stopped (predetermined value), the power control device 5 performs the entire surface control. In this case, it is considered that the front window is frozen, and thus the vehicle 100 is not able to start travelling and is stopped. Therefore, the power control device 5 performs the entire surface control to simultaneously energize all of the hot-wire heaters 1a and 1b provided in the front window.

Figure 2:
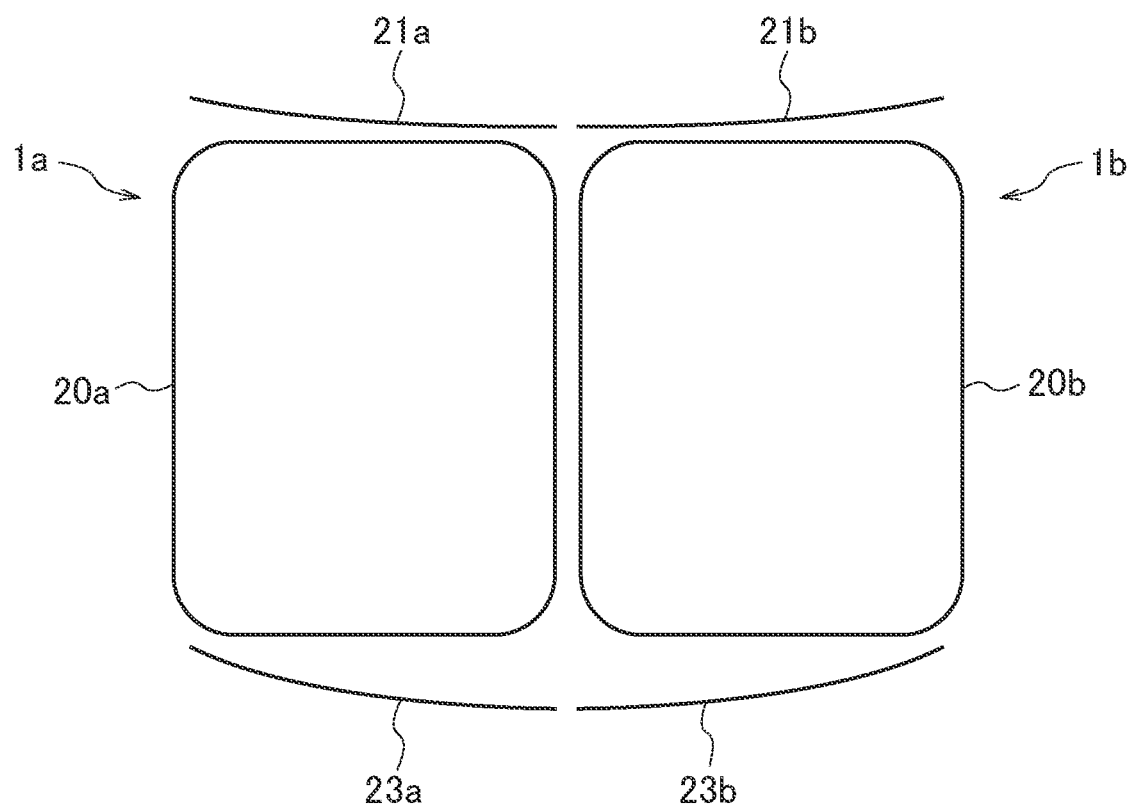
FIG. 2 is a diagram showing the structure of hot-wire heaters controlled by a power control device according to an embodiment of the present invention.

For example, in the entire surface control, both of the left hot-wire heater 1a and the right hot-wire heater 1b shown in FIG. 2 are energized simultaneously. At this time, in the entire surface control, it is necessary to melt ice on the front window. The ice on the front window can be melted quickly by energizing the heaters with the maximum power. However, the power supplied to the vehicle 100 does not become insufficient even when the heaters are energized with the maximum power. This is because the vehicle is stopped, and thus the power required for the vehicle to travel is not being used.

Further, when the external air temperature of the vehicle 100 is equal to or lower than the temperature at which the front window freezes (first temperature), and the speed of the vehicle 100 is faster than the speed at which the vehicle is considered to be stopped (predetermined value), the power control device 5 performs the alternating control. In this case, since the vehicle 100 is already travelling, it is considered that the front window is not frozen, and that it is sufficient if the fogging is removed. Therefore, the power control device 5 performs the alternating control to sequentially energize the hot-wire heaters 1a and 1b provided in the plurality of areas of the front window for each area.

For example, in the alternating control, the hot-wire heaters 1a and 1b shown in FIG. 2 are controlled such that the left hot-wire heater 1a and the right hot-wire heater 1b are alternately energized at intervals of several seconds to several tens of seconds. This can further reduce power consumption than when the entire surface control is performed. The alternating control does not have the ability to melt ice on a frozen front window. However, the device can function sufficiently even in the case of the alternating control, if the vehicle 100 is already travelling with the front window being not frozen, and it is only necessary to remove fogging.

When the entire surface control or the alternating control are performed for the hot-wire heaters 1a and 1b, the power control device 5 determines whether the total power consumption of the vehicle 100 is equal to or larger than a predetermined power value. That is, the power control device 5 determines whether the power supplied to the vehicle 100 includes surplus power. In a case where the power consumption of the vehicle 100 is equal to or larger than a predetermined power value, and the power does not include surplus power, the power control device 5 determines whether the seat heater 15 is in use, and when the seat heater 15 is in use, the energization amount to the seat heater 15 is reduced.

Accordingly, when the power supplied to the vehicle 100 does not include surplus power, by reducing the power to the seat heater 15, the power can be preferentially supplied to the hot-wire heaters 1a and 1b which are important for the vehicle to travel. A heater for which power is to be reduced is not limited to the seat heater 15, but may be any other heater as long as the heater is provided in the interior of the vehicle 100.

Further, when the external air temperature of the vehicle 100 is higher than the temperature (second temperature) at which heating is not used and which corresponds to the temperature in summer, the power control device 5 controls the hot-wire heaters 1a and 1b such that the hot-wire heaters 1a and 1b are not energized even when a switch for energizing the hot-wire heaters 1a and 1b is turned on. When a switch for energizing the hot-wire heaters 1a and 1b is turned on in spite of it being a temperature which does not require the use of heating, such an operation is considered to be an erroneous operation by an occupant of the vehicle 100. Therefore, in such a case, even when a switch for energizing the hot-wire heaters 1a and 1b is turned on, the power control device 5 controls the hot-wire heaters 1a and 1b such that the hot-wire heaters 1a and 1b are not energized. This avoids wasteful power consumption.

The power control device 5 is a controller that includes a general purpose electronic circuit having a microcomputer, a microprocessor, and a CPU, and a peripheral device such as a memory. A computer program for executing a power control process is installed in the power control device 5. Each function of the power control device 5 can be implemented by one or more processing circuits. The processing circuits include, for example, a programmed processing device having an electrical circuit. The processing circuits also include devices such as application specific integrated circuits (ASICs) that are arranged to perform functions described in the embodiment and conventional circuit components.

The vehicle control unit 7 is an ECU (Electronic Control Unit) that outputs a command signal for operating each unit of the vehicle in response to an operation signal input by an occupant of the vehicle 100 or a control signal input from a controller of the vehicle 100. The vehicle control unit 7 outputs, for example, a command signal for operating the hot-wire heaters 1a and 1b in response to a control signal output from the power control device 5.

The powertrain control unit 9 is an ECU that controls a powertrain such as a motor and a transmission. The powertrain control unit 9 obtains the speed of the vehicle 100 from a vehicle speed sensor (not shown), and controls a motor and a transmission in accordance with an accelerator operation.

The external air temperature sensor 11 is a sensor that detects the external air temperature of the vehicle 100, and outputs the detected external air temperature to the power control device 5.

The vehicle interior temperature sensor 13 is a sensor that detects the temperature in the interior of the vehicle 100, and outputs the detected vehicle interior temperature to the power control device 5.

The seat heater 15 is a heater that is disposed in a seat in the interior of the vehicle 100.

[Power Control Process]

Figure 3B:
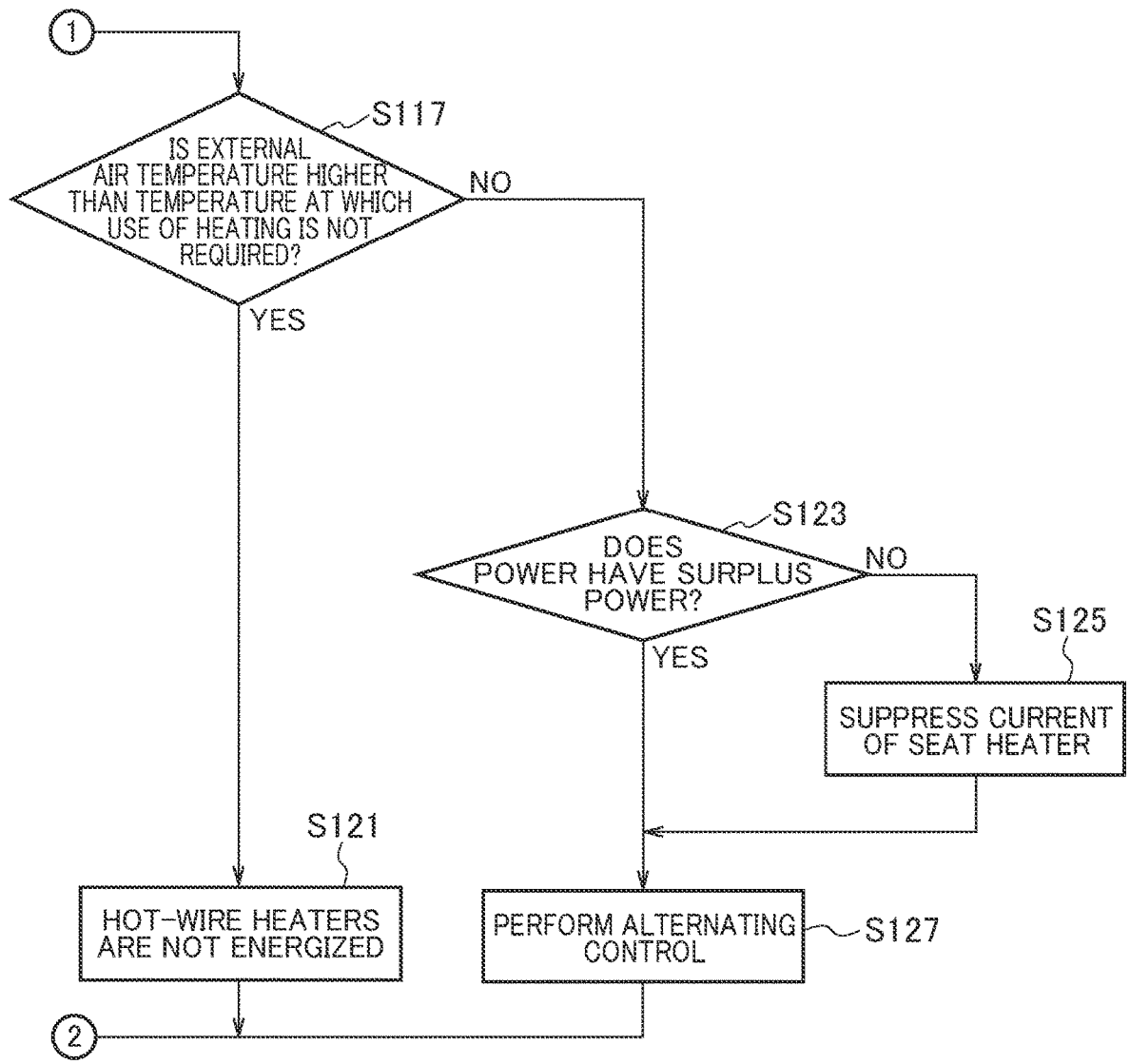
FIG. 3B is a flowchart showing a process procedure of a power control process performed by a power control device according to an embodiment of the present invention.

Next, a power control process performed b the power control device 5 according to the present embodiment will be described, FIGS. 3A and 3B are flowcharts showing processing procedures of the power control process performed by the power control device 5 according to the present embodiment. The power control process shown in FIGS. 3A and 3B starts after a switch for energizing the hot-wire heaters 1a and 1b is turned on.

As shown in FIG. 3A, in step S101, the power control device 5 obtains the external air temperature of the vehicle 100 from the external air temperature sensor 11. The power control device 5 determines whether the external air temperature of the vehicle 100 is equal to or lower than the temperature at which a front window freezes. When the external air temperature is equal to or lower than the freezing temperature, the process proceeds to step S103, and alternatively when the external air temperature is higher than the freezing temperature, the process proceeds to step S117.

In step S103, the power control device 5 determines whether the speed of the vehicle 100 is equal to or slower than the speed at which the vehicle is considered to be stopped. The speed of the vehicle 100 may be obtained from the powertrain control unit 9, or directly from a speed sensor (not shown). When the speed of the vehicle 100 is equal to or slower than the speed at which the vehicle is considered to be stopped, the process proceeds to step S105, and alternatively when the speed of the vehicle 100 is faster than the speed at which the vehicle is considered to be stopped, the process proceeds to step S111.

In step S105, the power control device 5 determines whether the power supplied to the vehicle 100 includes surplus power. Specifically, the power control device 5 obtains the total power consumption of the vehicle 100 from the DCDC converter 3 or another ECU. Then, the power control device 5 determines whether the obtained total power consumption of the vehicle 100 is equal to or larger than a predetermined power value to determine whether the power includes surplus power. When the power supplied to the vehicle 100 does not include surplus power, the process proceeds to step S107, and alternatively when the power supplied to the vehicle 100 includes surplus power, the process proceeds to step S109.

In step 107, first, the power control device 5 determines whether the seat heater 15 is in use. When the seat heater 15 is in use, the power control device 5 reduces the energization amount to the seat heater 15 because the power of the vehicle 100 does not include surplus power. Thereafter, the process proceeds to step S109.

In step S109, the power control device 5 performs the entire surface control for simultaneously energizing all of the hot-wire heaters 1a and 1b provided in the plurality of areas of the front window. Therefore, when the external air temperature of the vehicle 100 is equal to or lower than the temperature at which the front window freezes, and the speed of the vehicle 100 is equal to or slower than the speed at which the vehicle is considered to be stopped, the power control device 5 performs the entire surface control. After the entire surface control of the hot-wire heaters 1a and 1b is performed in this way, the power control process according to the present embodiment ends.

Next, a case will be described in which it is determined in step S103 that the speed of the vehicle 100 is faster than the speed at which the vehicle is considered to be stopped, and the process proceeds to step S111.

In step S111, the power control device 5 determines whether the power supplied to the vehicle 100 includes surplus power. Specifically, the power control device 5 obtains the total power consumption of the vehicle 100 from the DCDC converter 3 or another ECU. Then, the power control device 5 determines whether the obtained total power consumption of the vehicle 100 is equal to or larger than a predetermined power value to determine whether the power includes surplus power. When the power supplied to the vehicle 100 does not include surplus power, the process proceeds to step S113, and alternatively when the power supplied to the vehicle 100 includes surplus power, the process proceeds to step S115.

In step S113, the power control device 5 determines whether the seat heater 15 is in use. When the seat heater 15 is in use, the power control device 5 reduces the energization amount to the seat heater 15 because the power of the vehicle 100 does not include surplus power. Thereafter, the process proceeds to step S115.

In step S115, the power control device 5 performs the alternating control for sequentially energizing the hot-wire heaters 1a and 1b provided in the plurality of areas of the front window for each area. Therefore, when the external air temperature of the vehicle 100 is equal to or lower than the temperature at which the front window freezes, and the speed of the vehicle 100 is faster than the speed at which the vehicle is considered to be stopped, the power control device 5 performs the alternating control. After the alternating control of the hot-wire heaters 1a and 1b is performed in this way, the power control process according to the present embodiment ends.

Next, a case will be described in which it is determined in step S101 that the external air temperature of the vehicle 100 is higher than the temperature at which the front window freezes, and the process proceeds to step S117.

As shown in FIG. 3B, in step S117, first, the power control device 5 obtains the external air temperature of the vehicle 100 from the external air temperature sensor 11. Then, the power control device 5 determines whether the external air temperature of the vehicle 100 is higher than the temperature which does not require the use of heating and corresponds to the temperature in summer. When the external air temperature is equal to or lower than the temperature which does not require the use of heating, the process proceeds to step S123, and alternatively when the external air temperature is higher than the temperature which does not require the use of heating, the process proceeds to step S121.

In step S121, the power control device 5 controls the hot-wire heaters 1a and 1b such that the hot-wire heaters 1a and 1b are not energized even when a switch for energizing the hot-wire heaters 1a and 1b is turned on. In this case, even though the external air temperature is higher than the temperature which does not require the use of heating, a switch for energizing the hot-wire heaters 1a and 1b is turned on, and thus this operation is considered to be an erroneous operation by an occupant of the vehicle 100. Therefore, the power control device 5 controls the hot-wire heaters 1a and 1b such that the hot-wire heaters 1a and 1b are not energized even when a switch for energizing the hot-wire heaters 1a and 1b is turned on. This prevents wasteful power consumption. After the hot-wire heaters 1a and 1b are controlled such that the hot-wire heaters 1a and 1b are not energized in this way, the power control process according to the present embodiment ends.

Next, a case will be described in which it is determined in step S117 that the external air temperature of the vehicle 100 is equal to or lower than the temperature which does not require the use of heating and corresponds to the temperature in summer and the process proceeds to step S123.

In step S123, the power control device 5 determines whether the power supplied to the vehicle 100 includes surplus power. Specifically, the power control device 5 obtains the total power consumption of the vehicle 100 from the DCDC converter 3 or another ECU. Then, the power control device 5 determines whether the obtained total power consumption of the vehicle 100 is equal to or larger than a predetermined power value to determine whether the power includes surplus power. When the power supplied to the vehicle 100 does not include surplus power, the process proceeds to step S125, and alternatively when the power supplied to the vehicle 100 includes surplus power, the process proceeds to step S127.

In step S125, first, the power control device 5 determines whether the seat heater 15 is in use. When the seat heater 15 is in use, the power control device 5 reduces the energization amount to the seat heater 15 because the power of the vehicle 100 does not include surplus power. Thereafter, the process proceeds to step S127.

In step S127, the power control device 5 performs the alternating control for sequentially energizing the hot-wire heaters 1a and 1b provided in the plurality of areas of the front window for each area. Therefore, the power control device 5 performs the alternating control when the external air temperature is equal to or lower than the temperature which does not require the use of heating. After the alternating control of the hot-wire heaters 1a and 1b is performed in this way, the power control process according to the present embodiment ends.

Effect of Embodiment

As described above in detail, the power control device 5 according to the present embodiment switches between the alternating control and the entire surface control based on the external air temperature and the speed of the vehicle, the alternating control being for sequentially energizing each hot-wire heater provided in each of a plurality of areas of a front window, and the entire surface control being for simultaneously energizing all the hot-wire heaters provided in the plurality of areas. The alternating control capable of saving power can thereby be performed in accordance with the external air temperature and the speed of the vehicle. Accordingly, the power consumption of the vehicle can be reduced when the hot-wire heaters provided in the front window are energized.

Further, when the external air temperature of the vehicle is equal to or lower than a predetermined first temperature and the speed of the vehicle is equal to or slower than a predetermined value, the power control device 5 according to the present embodiment performs the entire surface control. Accordingly, when the external air temperature of the vehicle is low and the speed of the vehicle is also slow, ice on the front window can be quickly melted by means of the entire surface control in consideration of the frozen front window.

Further, when the external air temperature of the vehicle is equal to or lower than a predetermined first temperature and the speed of the vehicle is faster than a predetermined value, the power control device 5 according to the present embodiment performs the alternating control. Accordingly, when the speed of the vehicle is fast even through the external air temperature of the vehicle is low, it is determined that the front window is not frozen, and the power consumption of the vehicle can be reduced by means of the alternating control.

The power control device 5 according to the present embodiment determines whether the heater provided in the interior of the vehicle is in use in a case where the power consumption of the vehicle is equal to or larger than a predetermined power value, and when the heater is in use, the energization amount to the heater provided in the interior of the vehicle is reduced. This can reduce the energization amount to the heater provided in the vehicle interior in a case where the total power of the vehicle does not include surplus power. Accordingly, the power can be supplied preferentially to the hot-wire heaters.

Further, when the external air temperature of the vehicle is higher than a predetermined second temperature, the power control device 5 according to the present embodiment performs control such that the hot-wire heaters are not energized even when a switch for energizing the hot-wire heaters is turned on. This can avoid wasteful power consumption even when an occupant of the vehicle turns on the switch by mistake.

The above-described embodiment is an example of the present invention. For this reason, the present invention is not limited to the above-described embodiment, and even in forms other than the above-described embodiment, it is needless to say that various modifications are possible according to designs and the like within a scope not departing from the technical idea according to the present invention.

REFERENCE SIGNS LIST 1a, 1b Hot-wire heaters
3 DCDC converter
5 Power control device
7 Vehicle control unit
9 Powertrain control unit
11 External air temperature sensor
13 Vehicle interior temperature sensor
15 Seat heater
20a, 20b Electrothermal areas
21a, 21b, 23a, 23b Energizing electrodes
100 Vehicle

The invention claimed is:

1. A power control device comprising:
a processor configured to control electric power of a vehicle which includes hot-wire heaters provided respectively in a plurality of areas which are obtained by dividing a front window,
wherein the processor is configured to switch between alternating control and entire surface control based on an external air temperature of the vehicle and a speed of the vehicle, the alternating control being for sequentially energizing each hot-wire heater provided in each of the plurality of areas, and the entire surface control being for simultaneously energizing all the hot-wire heaters provided in the plurality of areas.

2. The power control device according to claim 1, wherein the processor is configured to perform the entire surface control when the external air temperature of the vehicle is equal to or lower than a predetermined first temperature and the speed of the vehicle is equal to or slower than a predetermined value.

3. The power control device according to claim 1, wherein the processor is configured to perform the alternating control when the external air temperature of the vehicle is equal to or lower than the predetermined first temperature and the speed of the vehicle is faster than the predetermined value.

4. The power control device according to claim 2, wherein the processor is configured to determine whether a heater provided in an interior of the vehicle is in use in a case where power consumption of the vehicle is equal to or larger than a predetermined power value, and reduce an energization amount to the heater provided in the interior of the vehicle when the heater is in use.

5. The power control device according to claim 1, wherein when the external air temperature of the vehicle is higher than a predetermined second temperature, the processor is configured not to energize the hot-wire heaters even when a switch for energizing the hot-wire heaters is turned on.

6. A power control method performed by a controller for controlling electric power of a vehicle which includes hot-wire heaters provided respectively in a plurality of areas which are obtained by dividing a front window, the power control method comprising:

switching between alternating control and entire surface control based on an external air temperature of the vehicle and a speed of the vehicle, the alternating control being for sequentially energizing each hot-wire heater provided in each of a plurality of areas, and the entire surface control being for simultaneously energizing all the hot-wire heaters provided in the plurality of areas.

* * * * *